United States Patent
Lee et al.

(10) Patent No.: US 9,480,972 B2
(45) Date of Patent: Nov. 1, 2016

(54) PHOTOCATALYST, PREPARATION METHOD THEREOF, AND PHOTOCATALYST APPARATUS

(71) Applicant: LG Hausys, Ltd., Seoul (KR)

(72) Inventors: Dong Il Lee, Anyang-si (KR); Seong Moon Jung, Daejeon (KR); Joo-Hwan Seo, Seoul (KR); Ju-Hyung Lee, Uiwang-si (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 14/401,064

(22) PCT Filed: Dec. 28, 2012

(86) PCT No.: PCT/KR2012/011736
§ 371 (c)(1),
(2) Date: Nov. 13, 2014

(87) PCT Pub. No.: WO2013/176369
PCT Pub. Date: Nov. 28, 2013

(65) Prior Publication Data
US 2015/0105235 A1   Apr. 16, 2015

(30) Foreign Application Priority Data
May 25, 2012 (KR) .......... 10-2012-0056125

(51) Int. Cl.
*B01J 23/42* (2006.01)
*C01G 19/02* (2006.01)
(Continued)

(52) U.S. Cl.
CPC .......... *B01J 23/42* (2013.01); *B01J 35/004* (2013.01); *B01J 35/023* (2013.01); *B01J 37/0215* (2013.01); *B01J 37/08* (2013.01); *B82Y 30/00* (2013.01); *C01G 1/02* (2013.01); *C01G 19/02* (2013.01); *C01G 23/047* (2013.01); *C01G 33/00* (2013.01); *C01G 41/02* (2013.01); *B01J 21/063* (2013.01); *B01J 23/40* (2013.01); *B01J 23/48* (2013.01); *B01J 23/72* (2013.01);
(Continued)

(58) Field of Classification Search
None
See application file for complete search history.

(56) References Cited

U.S. PATENT DOCUMENTS

| | | | | |
|---|---|---|---|---|
| 2003/0047028 | A1* | 3/2003 | Kunitake | ........ C01B 13/32 75/230 |
| 2008/0026183 | A1* | 1/2008 | Vanpoulle | ........ A01N 25/12 428/143 |
| 2011/0039692 | A1* | 2/2011 | Brooks | ........ B01D 53/864 502/339 |

FOREIGN PATENT DOCUMENTS

| | | |
|---|---|---|
| JP | 2001328201 A | 11/2001 |
| JP | 2005225758 A | 8/2005 |

(Continued)

OTHER PUBLICATIONS

Yu et al, sono- and Photochemical Routes for the Formation of HighlyDispersed Gold Nanoclusters in Mesoporous Titania Films, 2004, Adv. Funcy. Mater, vol. 14, No. 12, pp. 1178-1183.*

(Continued)

*Primary Examiner* — Melvin C Mayes
*Assistant Examiner* — Stefanie Cohen
(74) *Attorney, Agent, or Firm* — Hauptman Ham, LLP

(57) ABSTRACT

Provided are: a photocatalyst comprising a porous first metal oxide film having pores, and a second metal particle or a second metal oxide particle formed inside the pores; a method for preparing the photocatalyst; and a photocatalyst apparatus using the photocatalyst.

15 Claims, 4 Drawing Sheets

(51) Int. Cl.
*C01G 23/047* (2006.01)
*C01G 33/00* (2006.01)
*C01G 41/02* (2006.01)
*C01G 1/02* (2006.01)
*B82Y 30/00* (2011.01)
*B01J 35/00* (2006.01)
*B01J 35/02* (2006.01)
*B01J 37/08* (2006.01)
*B01J 37/02* (2006.01)
*B01J 21/06* (2006.01)
*B01J 37/03* (2006.01)
*B01J 37/34* (2006.01)
*B01J 23/40* (2006.01)
*B01J 23/48* (2006.01)
*B01J 23/72* (2006.01)
*B01J 35/10* (2006.01)

(52) U.S. Cl.
CPC .......... *B01J 35/006* (2013.01); *B01J 35/0013* (2013.01); *B01J 35/1061* (2013.01); *B01J 37/033* (2013.01); *B01J 37/345* (2013.01); *C01P 2004/64* (2013.01); *C01P 2004/84* (2013.01)

(56) References Cited

FOREIGN PATENT DOCUMENTS

KR 1020050114563 B1 2/2007
KR 100884018 B1 2/2009
WO WO 2004112958 A1 * 12/2004 .............. B01J 23/52

OTHER PUBLICATIONS

You et al, Effects of Calcination on the Physical and Photocatalytic Properties of TiO2 Powders Prepared by Sol—Gel Template Method, 2005, journal of sol gel and technology, vol. 34, pp. 181-187.*
Roos et al, Nanostructured, mesoporous Au/TiO2 model catalysts—structure, stability and catalytic properties, 2011, Beilstein Journal of nanotechnology.*
Ismail et al, Multilayered ordered mesoporous platinum/titania composite films: does the photocatalytic activity benefit from the film thickness?, J. Mater. Chem., 21, 7802-7810.*
Min Gyu Jeong, A study on the Synthesis of Metal Ion doped TiO2 Photocatalyst by Sol-Gel Method and Phtocatalytic Degradation, 2009, pp. 1-74.
Moon-Chan Kim, The characteristics of Mn-TiO2 catalyst for visible-light photocatalyst, 2011, pp. 493-502.
International Search Report for PCT/KR2012/011736 mailed on Apr. 5, 2013, citing the above reference(s).

* cited by examiner

PHOTOCATALYST, PREPARATION METHOD THEREOF, AND PHOTOCATALYST APPARATUS

CROSS REFERENCE TO RELATED APPLICATION

This application claims the priority of Korean Patent Application No. 10-2012-0056125 filed on May 25, 2012 in the Korean Patent and Trademark Office. Further, this application is the National Phase application of International Application No. PCT/KR2012/011736 filed on Dec. 28, 2012, which is incorporated herein by reference in its entirety.

TECHNICAL FIELD

The present invention relates to a photocatalyst, a method for preparing the same, and a photocatalytic apparatus.

BACKGROUND ART $TiO_2$, which is a representative photocatalytic material, is a safe and non-toxic material exhibiting excellent durability and abrasion resistance, and has a merit of low price. On the other hand, since $TiO_2$ can only absorb light having a wavelength less than that of ultraviolet light due to large band-gap energy thereof, there is a limit in applying $TiO_2$ to interior materials instead of exterior materials. In this regard, a lot of studies into a visible light-active catalyst capable of absorbing visible light have been made for application to interior materials. However, it is difficult to find a consistent result from a lot of studies and it is particularly difficult to find a visible light-active catalyst having performance verified under actual living conditions.

DISCLOSURE

Technical Problem

It is an aspect of the present invention to provide a visible light-responsive photocatalyst exhibiting excellent efficiency even under an indoor light source.

It is another aspect of the present invention to provide a method for preparing the photocatalyst as set forth above.

It is a further aspect of the present invention to provide a photocatalytic apparatus using the photocatalyst as set forth above.

Technical Solution

In accordance with one aspect of the present invention, a photocatalyst includes: a first porous metal oxide film including pores; and a second metal particle or a second metal oxide particle formed inside the pores.

The photocatalyst may be activated by visible light of a wavelength from about 380 nm to about 780 nm.

The second metal particles and the second metal oxide particles may each have an average diameter from about 1 nm to about 10 nm.

The first porous metal oxide film may have a thickness from about 30 nm to about 100 nm.

The first metal oxide included in the first metal oxide film may include at least one selected from among titanium oxide, tungsten oxide, zinc oxide, niobium oxide, and combinations thereof.

The second metal of the second metal particles and the second metal oxide particles may include at least one selected from among tungsten, chromium, vanadium, molybdenum, copper, iron, cobalt, manganese, nickel, platinum, gold, cerium, cadmium, zinc, magnesium, calcium, strontium, barium, radium, and combinations thereof.

A weight ratio of the first porous metal oxide film to the sum total of the second metal particles and the second metal oxide particles may be about 0.1:99.9 to about 1:99 in the photocatalyst.

In accordance with another aspect of the present invention, a method for preparing a photocatalyst includes: forming a first porous metal oxide film; dipping the first metal oxide film into a precursor solution of a second metal, followed by allowing the precursor solution of the second metal to permeate inner pores of the first porous metal oxide film; and forming particles of the second metal in the inner pores of the first porous metal oxide film by reduction of the second metal through light irradiation of the first porous metal oxide film containing the precursor solution of the second metal in the inner pores thereof.

Light irradiation may be UV irradiation.

The first metal oxide film may be formed on a substrate by a sol-gel method using a first metal oxide precursor, or by coating a slurry including the first metal oxide powder, a binder and a solvent onto the substrate.

After the first metal oxide film is formed by the sol-gel method using the first metal oxide precursor or by coating of the slurry including the first metal oxide powder, the binder and the solvent, heat treatment may be further performed to impart crystallinity to the first metal oxide film or to remove the binder from the first metal oxide film.

The method may further include creating a second metal oxide through oxidation of at least a portion of the second metal particles by heat treatment of the first porous metal oxide film containing the second metal particles formed inside the pores thereof.

In accordance with a further aspect of the present invention, a photocatalytic apparatus includes the photocatalyst as set forth above.

The photocatalytic apparatus may be used for purposes of air cleaning, deodorization, or antimicrobial effects.

Advantageous Effects

The photocatalyst is activated by visible light and has excellent photocatalytic efficiency.

BEST MODE

Figure 1:
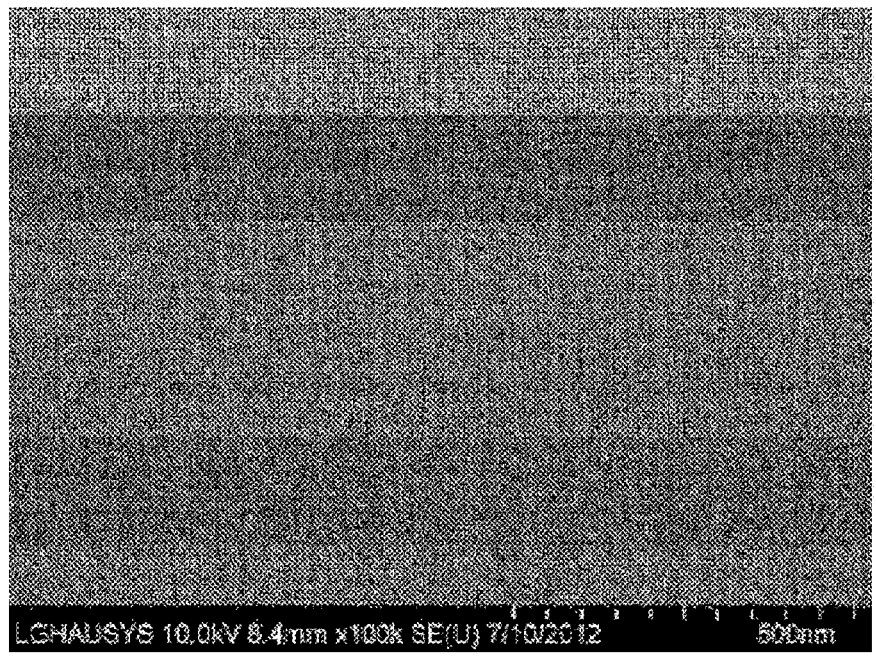
FIG. 1 is a TEM image of a photocatalyst prepared in Example 1.

Hereinafter, embodiments of the present invention will be described in detail. However, it should be understood that the following embodiments are provided for illustrative purposes only and are not to be in any way construed as limiting the present invention. The scope and sprit of the present invention should be defined only by the accompanying claims and equivalents thereof.

In accordance with one aspect of the present invention, a photocatalyst includes: a first porous metal oxide film including pores; and a second metal particle or a second metal oxide particle formed inside the pores. The first metal oxide forming the first porous metal oxide film may be any metal oxide used as a photocatalyst in the art without limitation. The second metal of the second metal particles or the second metal oxide particles may include metals capable of imparting activity to visible light to the photocatalyst by doping of the first metal oxide therewith. For example, the second metal may include transition metals, precious metals, and the like.

The photocatalyst may be activated by UV as well as visible light, and may absorb light throughout an overall range of visible light. For example, the photocatalyst may have an absorbance of about 20% for visible light of a wavelength of about 400 nm, and have an absorbance of about 10% for visible light of a wavelength of about 500 nm.

The photocatalyst is a material which can provide air cleaning, deodorization and antimicrobial effects since electrons and holes created by energy obtained by light absorption of the material generate superoxide anions, hydroxyl radicals, or the like. For example, the superoxide anions or hydroxyl radicals generated from the photocatalyst can degrade environmentally harmful substances such as formaldehyde. Since the photocatalyst can exhibit excellent efficiency even under an indoor light source due to high visible light absorbance thereof, the photocatalyst requires no separate UV supplying device.

The first metal oxide film may include first metal oxide particles having an average diameter from about 20 nm to about 100 nm, specifically from about 20 nm to about 50 nm, more specifically from about 20 nm to about 30 nm. The first metal oxide particles may be formed as fine nanoscale particles having uniform particle size distribution according to a method for preparing a photocatalyst described below. Since the photocatalyst includes the first metal oxide particles having the above size range, the photocatalyst includes a photocatalyst film having a large surface area and a uniform particle size, and thus can exhibit improved reactivity.

The second metal particles and the second metal oxide particles may have an average diameter from about 1 nm to about 10 nm, specifically from about 1 nm to about 5 nm. The second metal particles and the second metal oxide particles may be formed as nanoscale particles having uniform particle size distribution according to a method for preparing a photocatalyst described below. Since the photocatalyst uniformly includes the second metal particles and the second metal oxide particles having a size within the above range throughout the first metal oxide film, the photocatalyst can exhibit further improved activity to visible light.

In addition, the second metal particles and the second metal oxide particles may be uniformly dispersed in the inner pores of the first porous metal oxide film. As such, since the second metal particles and the second metal oxide particles are uniformly dispersed in the inner pores of the first porous metal oxide film, the photocatalyst can exhibit further improved activity to visible light.

A weight ratio of the first porous metal oxide film to the sum total of the second metal particles and the second metal oxide particles may be about 0.1:99.9 to about 1:99 in the photocatalyst.

The first porous metal oxide film may have a thickness from about 30 nm to about 100 nm.

The second metal of the second metal particles and the second metal oxide particles may include at least one selected from among tungsten, chromium, vanadium, molybdenum, copper, iron, cobalt, manganese, nickel, platinum, gold, cerium, cadmium, zinc, magnesium, calcium, strontium, barium, radium, and combinations thereof.

The metal oxide included in the first metal oxide film may include at least one selected from among titanium oxide, tungsten oxide, zinc oxide, niobium oxide, and combinations thereof.

In accordance with another aspect of the present invention, a method for preparing a photocatalyst includes: forming a first porous metal oxide film; dipping the first metal oxide film into a precursor solution of a second metal, followed by allowing the precursor solution of the second metal to permeate inner pores of the first porous metal oxide film; and forming particles of the second metal in the inner pores of the first porous metal oxide film by reduction of the second metal through light irradiation of the first porous metal oxide film containing the precursor solution of the second metal in the inner pores thereof.

The aforementioned photocatalyst may be prepared by a method for preparing a photocatalyst.

For example, a first porous metal oxide film may be formed on a substrate by a solution method. For example, the substrate may be a glass substrate.

In one embodiment, the first porous metal oxide film may be formed on the substrate by a sol-gel method using a first metal oxide precursor. Specifically, a solution including the first metal oxide precursor may be coated in a sol form, followed by drying to form a gel-phase film, and then optionally subjected to heat treatment, thereby forming a crystalline film. For example, first, the solution, which includes the first metal oxide precursor, such as metal alkoxide and the like, alcohol, acid and the like, may be prepared, followed by hydrolysis. Next, the solution may be subjected to dehydration and de-alcoholization to obtain the sol-state solution, followed by coating the sol-state solution onto a flat substrate. The sol-gel method may be performed under any process conditions known in the art without limitation.

In another embodiment, first, the first metal oxide film may be formed by coating a slurry including first metal oxide powder, a solvent and, optionally, a binder onto a substrate. As such, the first metal oxide film may also be formed by slurry coating under any process conditions known in the art without limitation. The binder is used to secure the first metal oxide to the substrate. For example, the binder may include polymeric resins, silane compounds, inorganic binders, and the like. After the film is formed by coating the slurry onto the substrate, heat treatment may be optionally further performed. When an organic binder is used, since crystallization and fixation are impossible due to removal of the binder during heat treatment, heat treatment may not be performed by use of first crystallized metal oxide powder to solve the above problem. In addition, when an inorganic binder is used, heat treatment may be performed for crystallization and fixation.

As described above, after the first metal oxide film is formed by the sol-gel method using the first metal oxide precursor or by coating of the slurry including the first metal oxide powder and the solvent, heat treatment may be further performed to impart crystallinity to the first metal oxide film.

Heat treatment may be performed at a heating speed from about 1° C./min to about 2° C./min. Through heat treatment at this heating speed, the first metal oxide film may be formed of the first metal oxide particles having an average diameter from about 20 nm to about 30 nm.

The first porous metal oxide film formed through the above film formation process was dipped into the precursor solution of the second metal, thereby allowing the precursor solution of the second metal to uniformly permeate the pores of the first porous metal oxide film.

Next, the second metal is reduced by light irradiation of the first porous metal oxide film containing the precursor solution of the second metal in the inner pores thereof, thereby forming the particles of the second metal in the inner pores of the first porous metal oxide film.

As such, since the first metal oxide formed as a film is doped with the second metal particles as the precursor solution of the second metal, the precursor solution of the second metal can easily and uniformly permeate the first metal oxide film and can also be uniformly dispersed therein. The second metal particles formed by light irradiation of the precursor solution of the second metal are also uniformly dispersed in the first metal oxide film. In addition, according to the method, the second metal particles can be formed as nanoscale particles having uniform particle size distribution. Since the second metal particles are formed by the method, the photocatalyst can exhibit excellent activity to visible light, as described above.

A precursor compound of the second metal capable of being used in the precursor solution of the second metal may be any salt compound, which is soluble in an aqueous solution, as a material capable of being reduced into the second metal by electrons excited through light irradiation without limitation. Specifically, the precursor compound of the second metal may include nitrates, sulfates, chlorides, bromides and the like of the second metal. Examples of a Cu precursor include $Cu(NO_3)_2$, $CuSO_4$, $CuCl_2$, $CuCl$, and the like; examples of a Pt precursor include $PtCl_2$, $PtCl_4$, $PtBr_2$, $H_2PtCl_6$, $K_2(PtCl_4)$, $Pt(NH_3)_4Cl_2$, and the like; examples of a Au precursor include $AuCl$, $AuBr$, $AuI$, $Au(OH)_3$, $HAuCl_4$, $KAuCl_4$, $KAuBr_4$, and the like; and examples of a Pd precursor include $(CH_3COO)_2Pd$, $PdCl_2$, $PdBr_2$, $PdI_2$, $Pd(OH)_2$, $Pd(NO_3)_2$, $PdSO_4$, and the like.

Specifically, light irradiation may be UV irradiation. Upon light irradiation, process conditions, such as intensity of light irradiation, light irradiation time, and the like, may be adjusted to adjust an amount of doping with the second metal in the photocatalyst. For example, to increase the amount of doping with the second metal, the amount of light irradiation and the light irradiation time may be increased.

The method for preparing a photocatalyst may optionally further include creating a second metal oxide through oxidation of at least a portion of the second metal particles by heat treatment of the first porous metal oxide film containing the second metal particles formed inside the pores thereof.

Heat treatment may be performed at a heating speed from about 1° C./min to about 2° C./min. Through heat treatment at this heating speed, the second metal particles and the second metal oxide particles may be formed to an average diameter from about 1 nm to about 10 nm.

In accordance with a further aspect of the present invention, a photocatalytic apparatus includes the photocatalyst as set forth above. For example, the photocatalytic apparatus may be manufactured as an apparatus for purposes of air cleaning, deodorization, or antimicrobial effects.

Hereinafter, the present invention will be described in more detail with reference to some examples. It should be understood that these examples are provided for illustration only and are not to be in any way construed as limiting the present invention.

EXAMPLE

Example 1

Preparation of $Pt/TiO_2$

Using isopropyl alcohol as a solvent, a 10 wt % titanium tetraisopropoxide solution was made. The solution was stirred for 30 minutes, followed by addition of a small amount of concentrated nitric acid, thereby performing hydrolysis. Next, the solution was subjected to dehydration and dealcoholization through stirring for 30 minutes, thereby forming a $TiO_2$ sol.

The $TiO_2$ sol was coated onto borosilicate glass, followed by heating the $TiO_2$ sol at a heating speed of 1° C./min from room temperature (25° C.) to 600° C. for crystallization of $TiO_2$, and then subjected to plasticization for 10 minutes while maintained at 600° C., thereby preparing a $TiO_2$ film having a size of 165 mm×165 mm and a thickness of 50 nm. The $TiO_2$ film was subjected to UV irradiation for about 30 minutes in a 0.01 wt % $H_2PtCl_6$ aqueous solution using a 20 W UV lamp, thereby doping the $TiO_2$ film with Pt. Next, the Pt-doped $TiO_2$ film was heated at a heating speed of 1° C./min from room temperature (25° C.) to 600° C., followed by heat treatment for 10 minutes, thereby preparing a photocatalyst.

Example 2

A photocatalyst was prepared in the same manner as in Example 1 except that the $TiO_2$ film was formed by heat treatment at a heating speed of 3° C./min.

Example 3

A photocatalyst was prepared in the same manner as in Example 1 except that the $TiO_2$ film was formed by heat treatment at a heating speed of 5° C./min.

Example 4

A photocatalyst was prepared in the same manner as in Example 1 except that heat treatment after Pt doping was performed at a heating speed of 3° C./min.

Example 5

A photocatalyst was prepared in the same manner as in Example 1 except that heat treatment after Pt doping was performed at a heating speed of 5° C./min.

Comparative Example 1

A photocatalyst was prepared in the same manner as the method for obtaining the porous $TiO_2$ film before Pt doping.

Comparative Example 2

$TiO_2$ nanopowder having a particle size of about 40 nm was dispersed to a concentration of 1 wt % in a 0.01 wt % $H_2PtCl_6$ aqueous solution, thereby preparing a $TiO_2$ slurry. Next, the $TiO_2$ slurry was subjected to UV irradiation for 30 minutes while being stirred. The $TiO_2$ slurry was separated into TiO₂ particles and a residual liquid through filtration or centrifugation, followed by drying, thereby obtaining Pt/TiO₂ powder. The Pt/TiO₂ powder was dispersed to a concentration of 10 wt % in water, followed by spin-coating to a thickness of 50 nm onto a borosilicate glass.

Experimental Example 1

Each of the photocatalysts of Examples 1 to 5 was evaluated as to particle size by taking a transmission electron microscope (TEM) image thereof, and evaluated as to an approximate particle diameter distribution range by the naked eye. Results are shown in Table 1.

Figure 2:
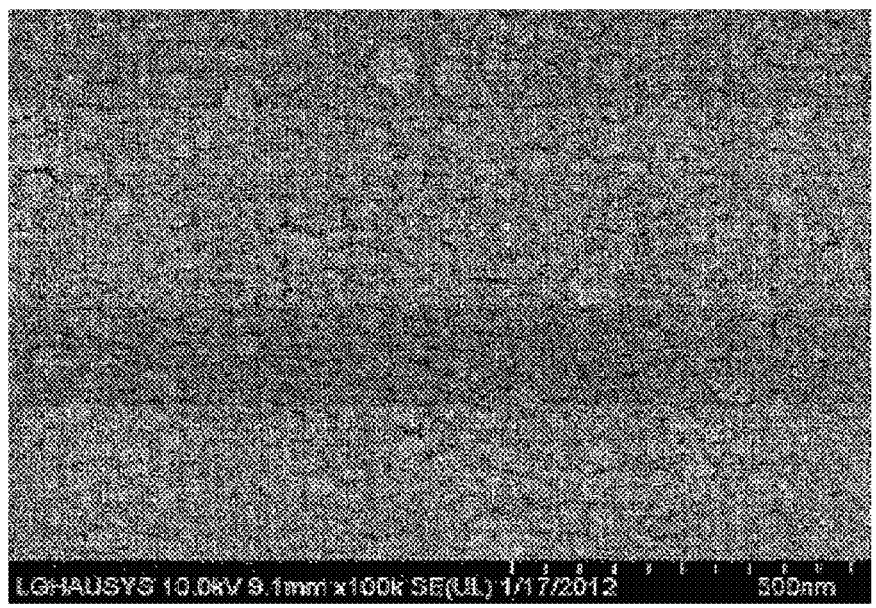
FIG. 2 is a TEM image of a photocatalyst prepared in Example 2.
Figure 3:
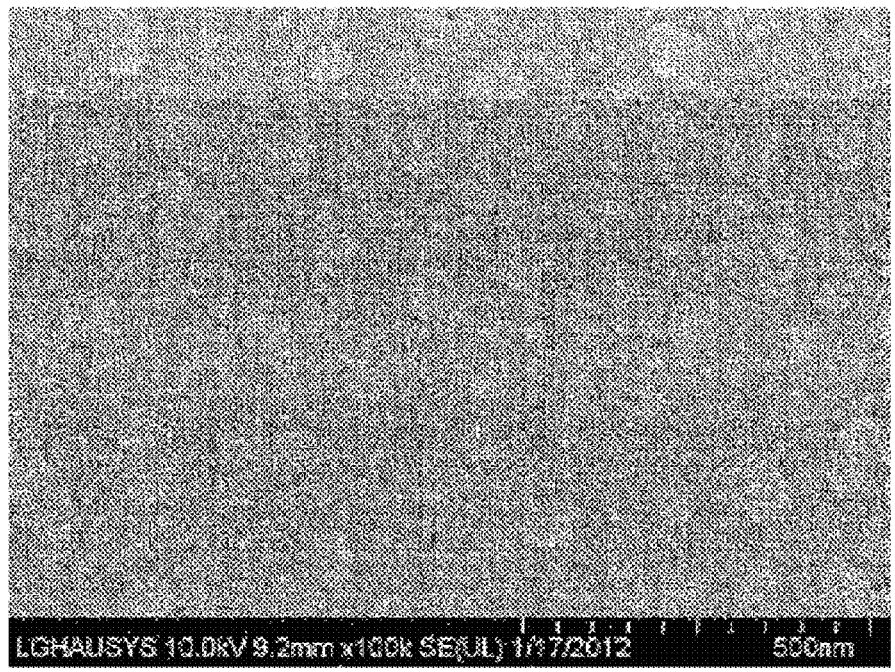
FIG. 3 is a TEM image of a photocatalyst prepared in Example 3.

FIGS. 1, 2 and 3 are TEM images of the photocatalysts of Examples 1, 2 and 3, respectively.

Figure 4:
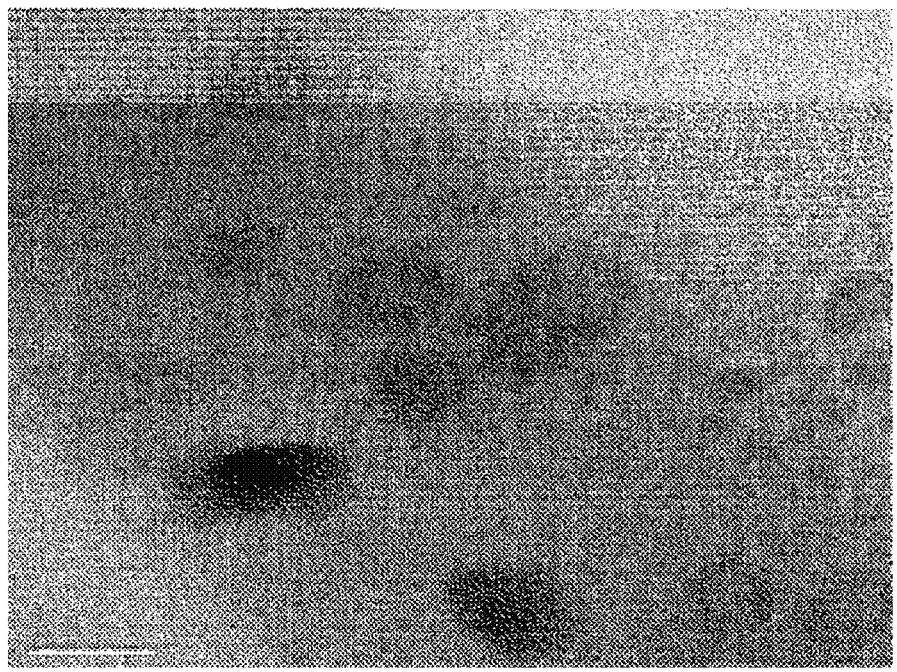
FIG. 4 is a TEM image of a cross section of a photocatalyst prepared in Example 1.

FIG. 4 is a TEM image of a cross section of the photocatalyst of Example 1. In FIG. 4, second metal particles (Pt particles) can be confirmed.

TABLE 1

|   | Diameter distribution range of first metal oxide particles [nm] | Diameter distribution range of second metal particles or second metal oxide particles [nm] |
|---|---|---|
| Example 1 | 20~30 | 1~10 |
| Example 2 | 20~50 | 1~10 |
| Example 3 | 20~100 | 1~10 |
| Example 4 | 20~30 | 1~20 |
| Example 5 | 20~30 | 1~30 |

Experimental Example 2

The photocatalysts of Example 1 and Comparative Examples 1 to 2 were evaluated as to formaldehyde removal performance. Each of the photocatalysts prepared in Example 1 and Comparative Examples 1 to 2 was placed in a 20 L small chamber (ADTEC Co., Ltd.), followed by allowing clean air having a formaldehyde concentration of 0.08 ppm to continuously flow at a flow rate of 167 cc/min, thereby setting the number of ventilation times to 0.5 times/hr. A 10 W white fluorescent lamp was used as a light source and was set to an illuminance of 1000 lux. The formaldehyde concentration was measured before and after clean air passed through the chamber, thereby calculating a formaldehyde removal rate. Calculation results are shown in Table 2. As for concentration, 10 L of the clean air was concentrated using a 2,4-dinitrophenylhydrazine (DNPH) cartridge, thereby analyzing concentration using a high-performance liquid chromatography (HLPC) apparatus (Agilent Co., Ltd.).

TABLE 2

|   | Formaldehyde removal rate |
|---|---|
| Example 1 | 50% |
| Example 2 | 30% |
| Example 3 | 25% |
| Example 4 | 30% |
| Example 5 | 25% |
| Comparative Example 1 | 0% |
| Comparative Example 2 | 20% |

The invention claimed is:

1. A photocatalyst comprising:
   a first porous metal oxide film comprising pores; and
   second metal particles or second metal oxide particles formed inside the pores, wherein
   the second metal of the second metal particles and the second metal oxide particles comprises at least one selected from the group consisting of tungsten, chromium, vanadium, molybdenum, copper, nickel, platinum, cerium, cadmium, zinc, strontium, radium, and combinations thereof,
   the first metal oxide film comprises first metal oxide particles having an average diameter from 20 nanometers (nm) to 100 nm,
   the second metal particles and the second metal oxide particles each have an average diameter from about 1 nm to about 10 nm, and
   the first porous metal oxide film has a thickness from 30 nm to 100 nm.

2. The photocatalyst according to claim 1, wherein the photocatalyst is activated by visible light of a wavelength from 380 nm to 780 nm.

3. The photocatalyst according to claim 1, wherein the first metal oxide comprised in the first metal oxide film comprises at least one selected from the group consisting of titanium oxide, tungsten oxide, zinc oxide, niobium oxide, and combinations thereof.

4. The photocatalyst according to claim 1, wherein a weight ratio of the first porous metal oxide film to the sum total of the second metal particles and the second metal oxide particles is 0.1:99.9 to 1:99 in the photocatalyst.

5. A method for preparing a photocatalyst, comprising:
   forming a first porous metal oxide film;
   dipping the first metal oxide film into a precursor solution of a second metal, followed by allowing the precursor solution of the second metal to permeate inner pores of the first porous metal oxide film; and
   forming particles of the second metal in the inner pores of the first porous metal oxide film by reduction of the second metal through light irradiation to the first porous metal oxide film containing the precursor solution of the second metal in the inner pores thereof wherein
   the second metal of the second metal particles and the second metal oxide particles comprises at least one selected from the group consisting of tungsten, chromium, vanadium, molybdenum, copper, nickel, platinum, cerium, cadmium, zinc, strontium, radium, and combinations thereof,
   the first metal oxide film comprises first metal oxide particles having an average diameter from 20 nanometers (nm) to 100 nm,
   the second metal particles and the second metal oxide particles each have an average diameter from about 1 nm to about 10 nm, and
   the first porous metal oxide film has a thickness from 30 nm to 100 nm.

6. The method according to claim 5, wherein light irradiation is UV irradiation.

7. The method according to claim 5, wherein light irradiation is UV irradiation method according to claim 5, wherein the first metal oxide film is formed on a substrate by a sol-gel method using a first metal oxide precursor, or by coating a slurry comprising first metal oxide powder, a binder and a solvent onto the substrate.

8. The method according to claim 5, further comprising:
   performing a first heat treatment to impart crystallinity to the first metal oxide film or to remove a binder from the first metal oxide film, after the first metal oxide film is formed by a sol-gel method using a first metal oxide precursor or by coating of a slurry comprising first metal oxide powder, the binder and a solvent.

9. The method according to claim 8, wherein the first heat treatment is performed at a heating speed from 1° C./min to 2° C./min.

10. The method according to claim 5, further comprising:
creating a second metal oxide through oxidation of at least a portion of the second metal particles by a second heat treatment of the first porous metal oxide film containing the second metal particles formed inside the pores thereof.

11. The method according to claim 10, wherein the second heat treatment is performed at a heating speed from 1° C./min to 2° C./min.

12. A photocatalytic apparatus comprising the photocatalyst according to claim 1.

13. The photocatalytic apparatus according to claim 12, wherein the photocatalytic apparatus is used for purposes of air cleaning, deodorization or antimicrobial effects.

14. A photocatalytic apparatus comprising a photocatalyst comprising:

a first porous metal oxide film comprising pores; and
second metal particles or second metal oxide particles formed inside the pores, wherein
the second metal of the second metal particles and the second metal oxide particles comprises at least one selected from the group consisting of tungsten, chromium, vanadium, molybdenum, copper, iron, cobalt, manganese, nickel, platinum, cerium, cadmium, zinc, magnesium, calcium, strontium, barium, radium, and combinations thereof,
the first metal oxide film comprises first metal oxide particles having an average diameter from 20 nanometers (nm) to 100 nm,
the second metal particles and the second metal oxide particles each have an average diameter from about 1 nm to about 10 nm, and
the first porous metal oxide film has a thickness from 30 nm to 100 nm.

15. The method according to claim 10, wherein the second heat treatment comprises heating the first porous metal oxide film to 600° C.

* * * * *